(12) United States Patent
Proctor et al.

(10) Patent No.: US 6,550,254 B2
(45) Date of Patent: Apr. 22, 2003

(54) GAS TURBINE ENGINE BLEED SCOOPS

(75) Inventors: Robert Proctor, West Chester, OH (US); Julius John Montgomery, Mason, OH (US); Michael Jay Epstein, Mason, OH (US); Roger Owen Barbe, Montgomery, OH (US); Hai Buu Sam, Hamilton, OH (US); James Bernar Ogzewalla, Maysville, KY (US); Andrew David Kemp, Loveland, OH (US); Bryan Keith Doloresco, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/932,585

(22) Filed: Aug. 17, 2001

(65) Prior Publication Data

US 2003/0033815 A1 Feb. 20, 2003

(51) Int. Cl.$^7$ .................................. F02C 6/08
(52) U.S. Cl. ........................................ 60/785; 415/144
(58) Field of Search ............................ 60/785; 415/144

(56) References Cited

U.S. PATENT DOCUMENTS

| | | | |
|---|---|---|---|
| 4,155,680 A | * 5/1979 | Linko et al. | ................. 415/144 |
| 5,271,711 A | 12/1993 | McGreehan et al. | |
| 5,392,614 A | 2/1995 | Coffinberry | |
| 6,086,326 A | * 6/2000 | Honda et al. | ................. 60/785 |

* cited by examiner

Primary Examiner—Louis J. Casaregola
(74) Attorney, Agent, or Firm—William Scott Andes; Robert B. Reeser, III; Armstrong Teasdale LLP

(57) ABSTRACT

A gas turbine engine includes a compressor including a casing and a stator assembly. The casing extends around the stator assembly, the stator assembly including a plurality of stator vanes, and a plurality of bleed scoops. Adjacent stator vanes define a static high-pressure region, the bleed scoops formed at least partially within the high pressure region.

13 Claims, 4 Drawing Sheets

GAS TURBINE ENGINE BLEED SCOOPS

BACKGROUND OF THE INVENTION

This invention relates generally to gas turbine engines, and more specifically to bleed scoops used in gas turbine engine high-pressure compressors.

At least some known gas turbine engines include a compressor, a combustor, and at least one turbine. The compressor compresses air that is mixed with fuel and channeled to the combustor. The mixture is then ignited for generating hot combustion gases, and the combustion gases are channeled to the turbine which extracts energy from the combustion gases for powering the compressor, as well as producing useful work to propel an aircraft in flight or to power a load, such as an electrical generator.

The compressor includes a rotor assembly and a stator assembly. The rotor assembly includes a plurality of rotor blades extending radially outward from a disk. More specifically, each rotor blade extends radially between a platform adjacent the disk, to a tip. A gas flowpath through the rotor assembly is bound radially inward by the rotor blade platforms, and radially outward by a plurality of shrouds.

The stator assembly includes a plurality of stator vanes that form nozzles that direct the compressed gas entering the compressor to the rotor blades. The stator vanes extend radially between a root platform and an outer band. The outer band retains the stator vanes and mounts the stator assembly within the compressor casing. The stator assembly also forms a bleed plenum between the outer band and the compressor casing.

Within at least some known gas turbine engines, a portion of high-pressure air is extracted or bled from the compressor and directed to a clearance control system. More specifically, a bleed scoop in the stator assembly outer band channels the extracted air to a bleed plenum for the clearance control system. However, the effectiveness of the clearance control system may be reduced because the pressure of the extracted air drops as it passes through the bleed scope. Further, the bleed scoop can provide compressed air with both static and dynamic pressure components.

BRIEF SUMMARY OF THE INVENTION

In an exemplary embodiment, a method for operating a gas turbine engine includes a compressor including stator vanes, a stator assembly, a compressor casing, and a bleed plenum. Adjacent stator vanes define a region between the vanes of high static pressure. The method includes extracting pressurized air from the compressor into at least one bleed scoop formed within the high static pressure regions defined by the adjacent stator vanes and directing the airflow from the bleed scoops into a bleed plenum.

In another aspect, a compressor for a gas turbine engine, the compressor comprises a casing and a stator assembly. The stator assembly comprises a plurality of stator vanes, adjacent stator vanes defining a static high-pressure region between the vanes. The stator assembly also defines at least one bleed scoop extending at least partially through the static high-pressure region adjacent the stator vanes and in flow communication with the gas flowpath and a bleed plenum.

In another aspect, a gas turbine engine includes a compressor including a casing and a stator assembly. The casing extends around the stator assembly, the stator assembly including a plurality of stator vanes, and a plurality of bleed scoops. Adjacent stator vanes define a static high-pressure region, the bleed scoops formed at least partially within the high-pressure region.

DETAILED DESCRIPTION OF THE INVENTION

Figure 1:
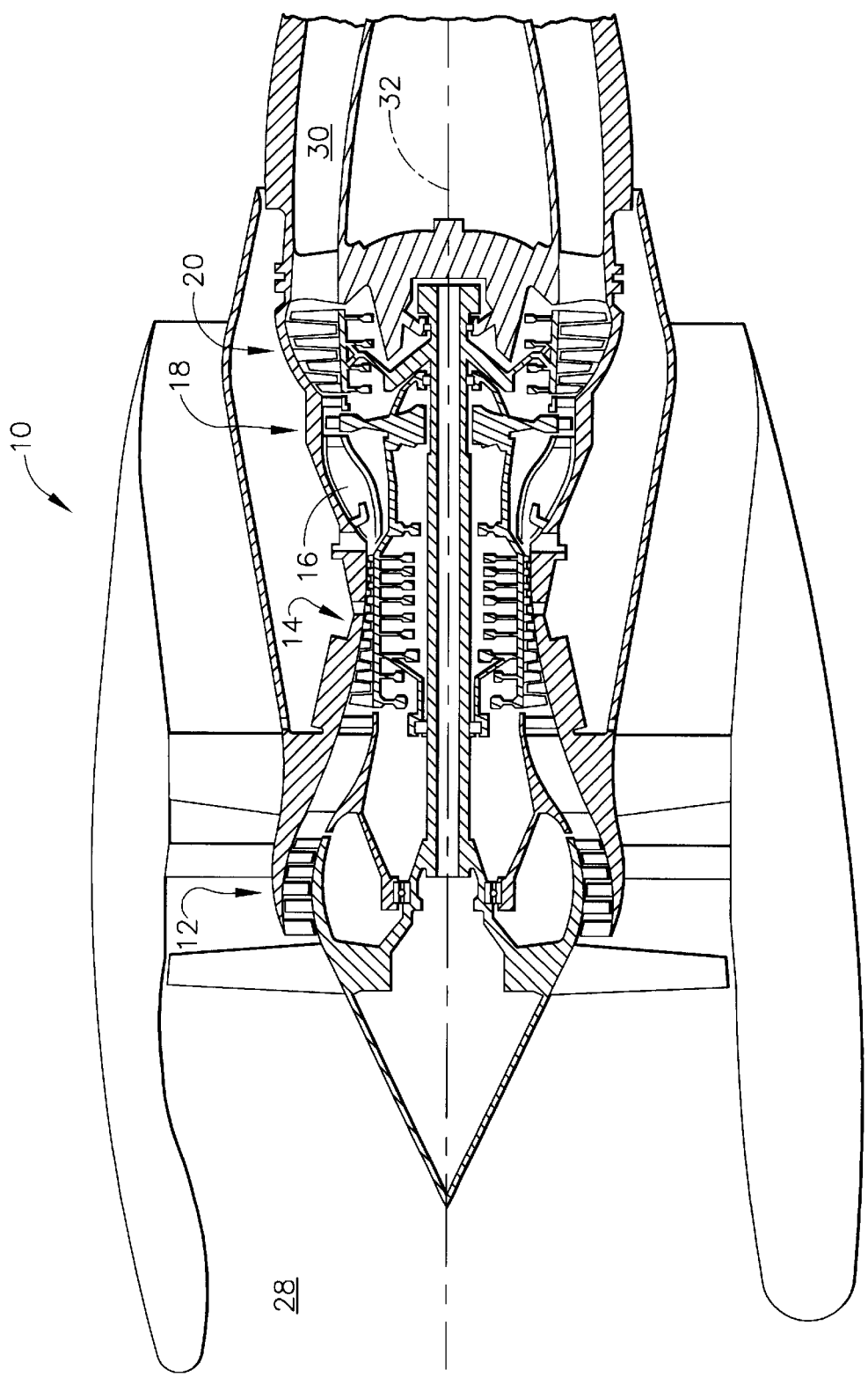
FIG. 1 is schematic illustration of a gas turbine engine.

FIG. 1 is a schematic illustration of a gas turbine engine 10 including a fan assembly 12, a compressor 14, and a combustor 16. In one embodiment, compressor 14 is a high-pressure compressor. Engine 10 also includes a high-pressure turbine 18, and a low-pressure turbine 20. Engine 10 has an intake side 28, an exhaust side 30, and an axis 32. In one embodiment, engine 10 is a CFM 56 engine commercially available from General Electric Company, Cincinnati, Ohio.

In operation, air flows through fan assembly 12 and compressed air is supplied to compressor 14. The compressed air is delivered to combustor 16. Airflow from combustor 16 drives turbines 18 and 20, and turbine 20 drives fan assembly 12.

Figure 2:
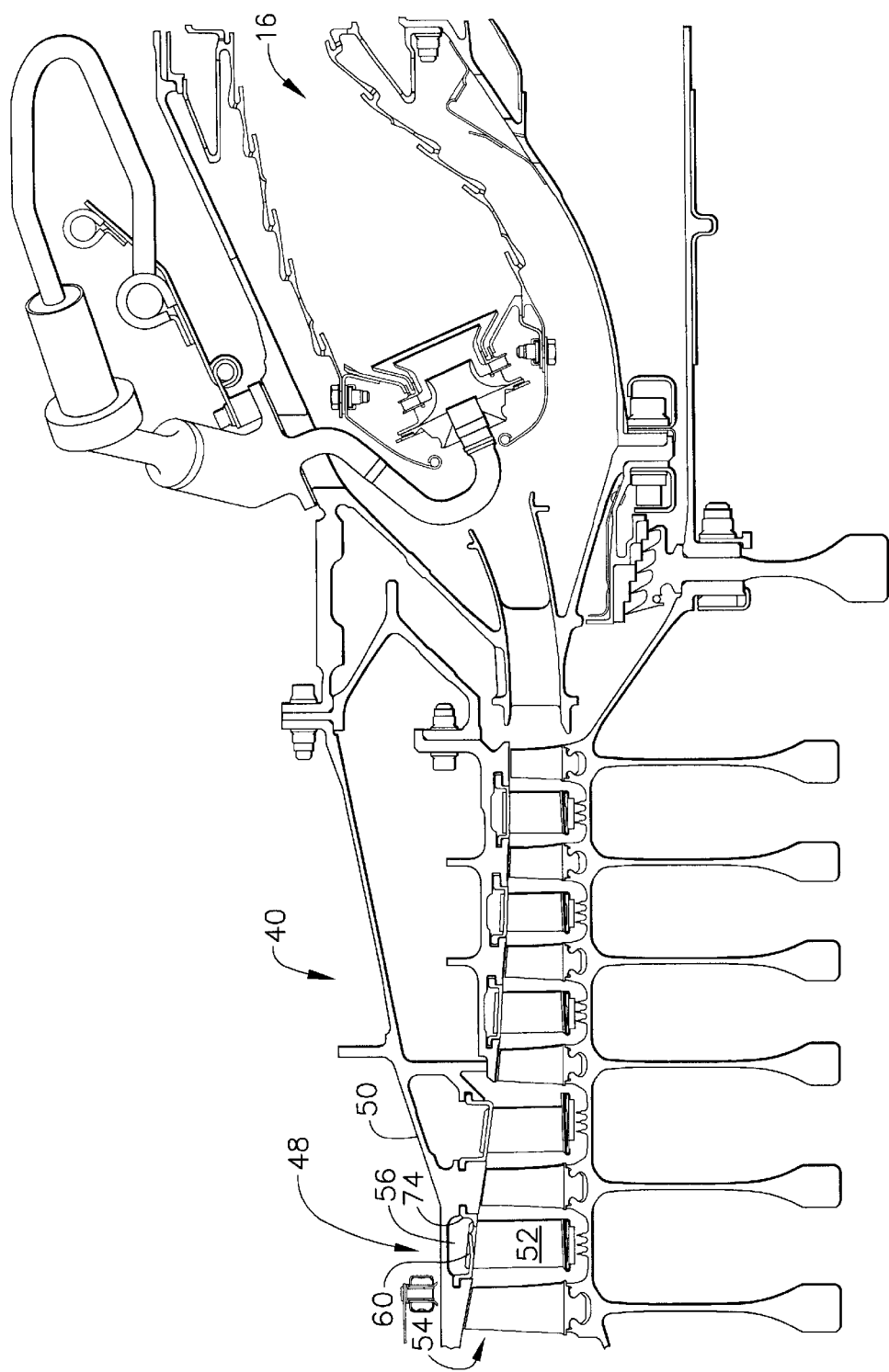
FIG. 2 is a schematic illustration of a compressor that may be used with a gas turbine engine shown in FIG. 1.

FIG. 2 is a schematic illustration of a compressor 40 that may be used in a gas turbine engine, such as gas turbine engine 10 (shown in FIG. 1). Compressor 40 includes a stator assembly 48 and a compressor casing 50 extending around stator assembly 48. Stator assembly 48 includes a plurality of stator vanes 52 within a gas flowpath 54, a bleed plenum 56 and an outer band 60. Bleed plenum 56 is formed between compressor casing 50 and outer band 60. In the exemplary embodiment, bleed plenum 56 is radially outward from a plurality of 4th stage stator vanes 52.

Figure 3:
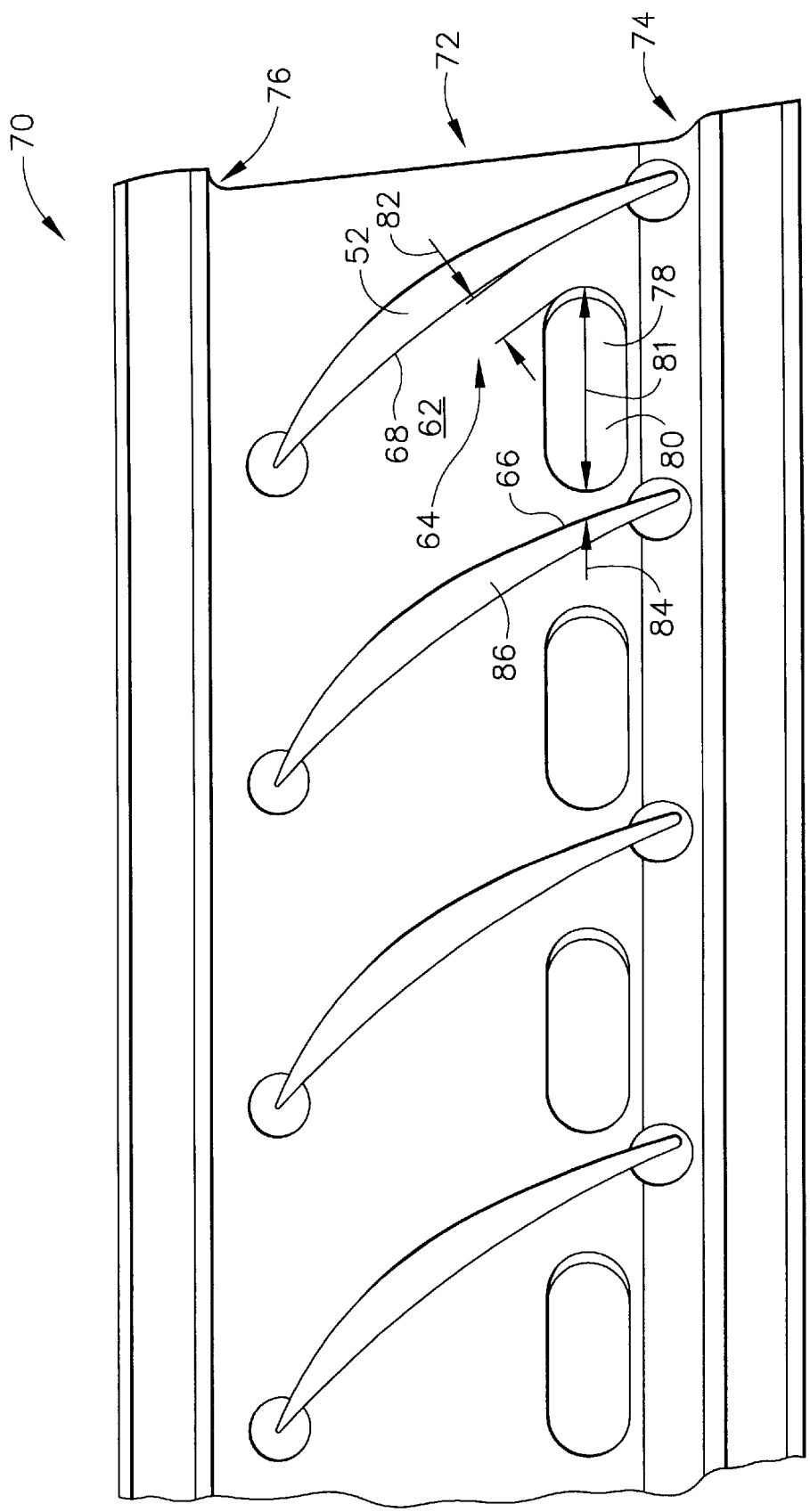
FIG. 3 is a plan view of a known stator assembly including a bleed scoop.

FIG. 3 a plan view of a known stator assembly 70 including a bleed scoop 78 defined within an outer band 72. More specifically, stator assembly 70 is a known 4th stage stator assembly used in a CFM-56 engine. Each stator vane 52 includes a suction sidewall 66 and a pressure sidewall 68. Stator assembly 70 includes an outer band 72, which includes a raised aft radius 74, a raised forward radius 76, and an area 62 between vanes 52. During operating conditions, a static high-pressure region 64 is formed in area 62 between adjacent vanes 52, adjacent outer band 72. Bleed scoop 78 is located in outer band 72 and is generally equidistant between adjacent stator vanes 52 within area 62. At least one known bleed scoop 78 has an elongated oval cross-sectional area 80 and includes a cross-sectional area of approximately 0.06 square inches through outer band 72. Oval cross-sectional area 80 includes a long axis 81 that is oriented circumferentially from pressure sidewall 68 to suction sidewall 66. More specifically, bleed scoop 78 is positioned a first offset distance 82 of approximately 0.08 inches from pressure sidewall 68 and a second offset distance 84 of approximately 0.05 inches from suction sidewall 66 of an adjacent stator vane 86. Bleed scoop 78 is also dispiaced from raised aft radius 74.

Figure 4:
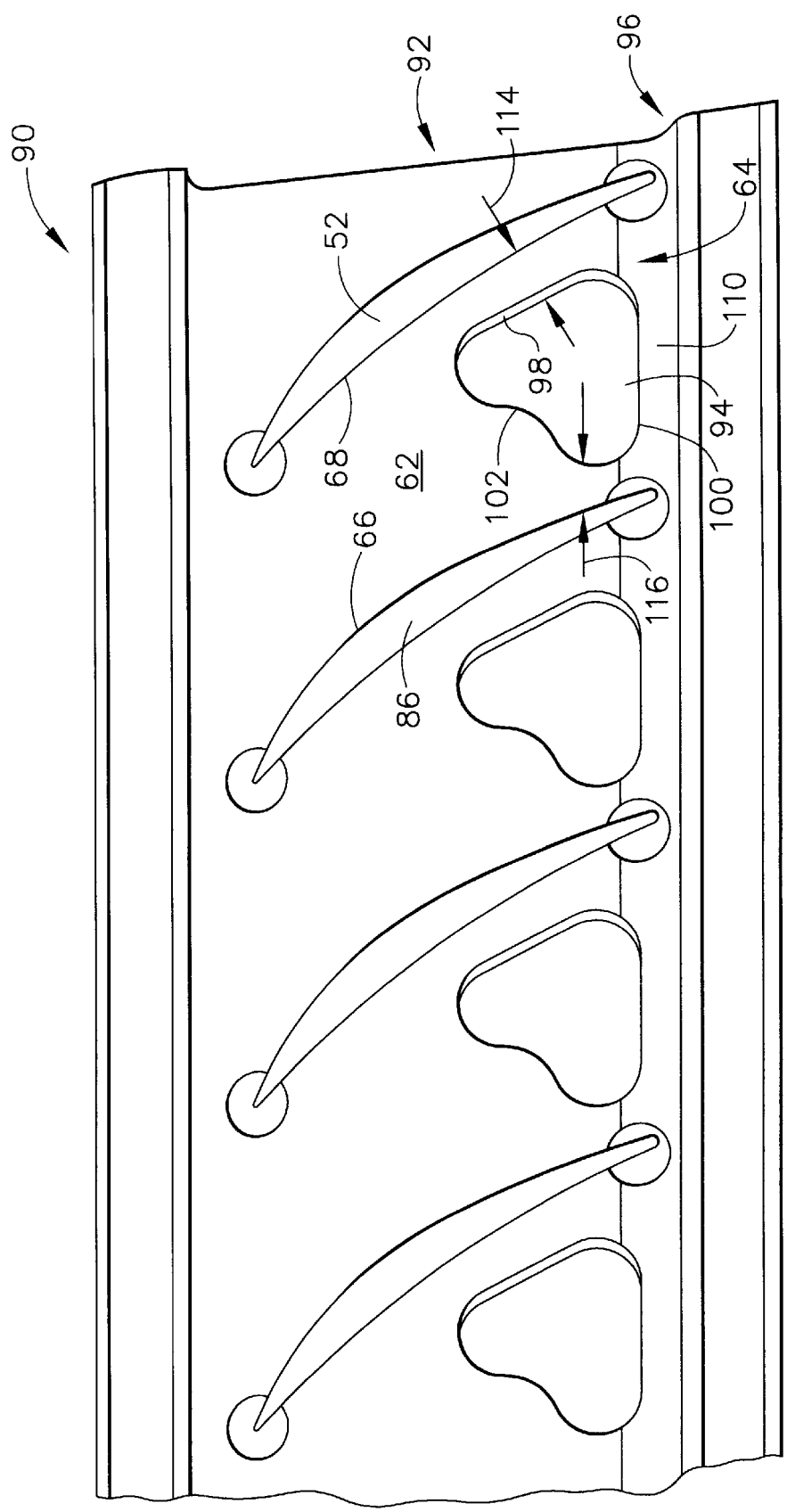
FIG. 4 is a plan view of an exemplary stator assembly that may be used with the gas turbine engine shown in FIG. 1.

FIG. 4 is a plan view of an exemplary stator assembly 90 that may be used with the gas turbine engine 10 shown in FIG. 1. More specifically, stator assembly 90 is an exemplary embodiment of a 4th stage stator assembly. Stator assembly 90 includes stator vane 52 with suction sidewall 66, pressure sidewall 68 and area 62 between suction sidewall 66 and pressure sidewall 68. Stator assembly 90 includes an outer band 92, a bleed scoop 94 and a raised aft radius 96. Bleed scoop 94 includes an adjacent side 98, an aft side 100 and a contoured side 102. During operating conditions, static high-pressure region 64 is located adjacent pressure sidewall 68 and raised aft radius 96 within area 62. Bleed scoop 94 is formed in high-pressure region 64. Further, bleed scoop 94 is contoured to conform to and substantially encompass high-pressure region 64, extending both circumferentially and radially. In one embodiment, bleed scoop 94 is formed in outer band 92 and raised aft radius 96, extending radially through outer band 92 and raised aft radius 96. Bleed scoop 94 includes a cross-sectional area 110 of greater than approximately 0.08 square inches. In the exemplary embodiment, bleed scoop 94 presents a generally triangular cross-sectional area 110, including 0.09 square inches. Bleed scoop adjacent side 98 is adjacent stator vane pressure sidewall 68, within a first offset distance 114 of less than 0.06 inches from pressure sidewall 68 to adjacent side 98. In the exemplary embodiment, first offset distance 114 is approximately 0.05 inches. Also in the exemplary embodiment, bleed scoop 94 is a second offset distance 116 of approximately 0.1 inches from suction sidewall 66 of adjacent stator vane 86. Contoured side 102 corresponds to the predetermined pressures contours of high-pressure region 64. Bleed scoop 94 facilitates pressurized air flow from area 62 to bleed plenum 56.

In use, compressor 40 supplies compressed air to combustor 16 (shown in FIG. 1). A portion of the compressed air, generally less than 5%, is extracted or bled off by bleed scoop 94 to bleed plenum 56 (shown in FIG. 2) for use by the clearance control system (not shown). Field studies, computer modeling or combinations of methods are used to determine the pressure contour of high-pressure region 64 between stator vanes 52 adjacent outer band 60. Forming bleed scoop 94 in high-pressure region 64 provides higher pressure compressed air to bleed plenum 56. With bleed scoop 94 in high-pressure region 64, pressurized air is extracted from compressor 40 into bleed scoop 94. The pressurized air is then directed to bleed plenum 56. Further, contouring bleed scoop cross-sectional area 110 to the shape of high-pressure region 64 reduces the pressure drop at bleed scoop 94. More specifically, during engine operation with bleed scoop 94, at a 2% bleed rate (the ratio of airflow through bleed scoop 94 to airflow through compressor 40), the ratio of gas flowpath pressure to bleed plenum pressure is approximately 1.21, a significant improvement. With bleed scoop 78 (shown in FIG. 3), at a 2% bleed rate, the ratio of gas flowpath pressure to bleed plenum pressure is approximately 1.24. Bleed scoop 94 facilitates more efficient extraction of compressed air, with reduced pressure loss. Bleed scoop 94 facilitates a higher bleed plenum 56 pressure at a given bleed rate, enabling more efficient operation clearance control system operation.

The above-described bleed scoop is cost-effective and highly reliable. The bleed scoop is located in the high-pressure regions adjacent compressor stator vanes and contoured to provide a larger cross-section in the high-pressure regions. Reducing the pressure drop in the extracted air as it passes through the bleed scoop to the bleed plenum facilitates higher pressure in the bleed plenum at a given bleed rate, and improved engine efficiency. As a result, the pressure drop through the bleed scoop is reduced, facilitating improved turbine operations.

While the invention has been described in terms of various specific embodiments, those skilled in the art will recognize that the invention can be practiced with modification within the spirit and scope of the claims.

What is claimed is:

1. A compressor for a gas turbine engine, said compressor comprising:

a casing; and a stator assembly comprising a plurality of stator vanes, adjacent stator vanes defining a static high pressure region between said vanes, said stator assembly defining at least one bleed scoop extending at least partially through the static high-pressure region adjacent said stator vanes and in flow communication with the gas flowpath and a bleed plenum, each said stator vane comprises a pressure sidewall and a suction sidewall, said bleed scoop comprises an adjacent side, an aft side, and a contoured side, said adjacent side adjacent at least one said stator vane pressure sidewall.

2. A compressor in accordance with claim 1 wherein said stator assembly comprises an outer band aft radius, said bleed scoop aft side extending through said outer band aft radius.

3. A compressor in accordance with claim 1 wherein said bleed scoop defines a cross-sectional area greater than about 0.08 square inches.

4. A compressor in accordance with claim 1 wherein said bleed scoop defines a non-elliptical cross-sectional area.

5. A compressor in accordance with claim 1 wherein said bleed scoop defines a generally triangular cross-section.

6. A compressor in accordance with claim 1 wherein under operating conditions the gas flowpath defines a main pressure and a main flowrate, said bleed plenum defines a plenum pressure and a plenum flowrate, said bleed scoop operates with a main pressure to plenum pressure ratio of about 1.21 at a plenum flowrate to main flowrate of about 2%.

7. A compressor in accordance with claim 1 wherein said bleed scoop comprises a contoured outer surface to facilitate reducing a pressure drop between said gas flowpath and said bleed plenum.

8. A gas turbine engine comprising a compressor comprising a casing and a stator assembly, said casing extending around said stator assembly, said stator assembly comprising a plurality of stator vanes, and a plurality of bleed scoops, adjacent stator vanes defining a static high-pressure region, said bleed scoops formed at least partially within the high pressure region, each said compressor bleed scoop cross-sectional area is greater than about 0.08 square inches.

9. A gas turbine engine in accordance with claim 8 wherein each said compressor stator vane comprises a pressure sidewall, each said compressor bleed scoop comprises an adjacent side, an aft side, and a contoured side, said adjacent side adjacent said stator vane pressure sidewall.

10. A gas turbine engine in accordance with claim 8 wherein said compressor stator assembly further comprises an outer band aft radius, said compressor bleed scoop aft side extends through said outer band aft radius.

11. A gas turbine engine in accordance with claim 8 wherein each said compressor bleed scoop defines a non-elliptical cross-sectional area.

12. A gas turbine engine in accordance with claim 11 wherein each said compressor bleed scoop defines a substantially triangular cross-sectional area.

13. A gas turbine engine in accordance with claim 8 wherein said compressor stator assembly further comprises a bleed plenum, each said compressor bleed scoop comprises a contoured outer surface to facilitate reducing a pressure drop between said gas flow path and a bleed plenum.

* * * * *